July 18, 1933.  O. H. HANSEN  1,918,641
CAN FILLING MACHINE
Original Filed March 3, 1930  4 Sheets-Sheet 1

INVENTOR
O. H. Hansen

BY Morsell & Morsell
ATTORNEYS.

July 18, 1933.  O. H. HANSEN  1,918,641

CAN FILLING MACHINE

Original Filed March 3, 1930    4 Sheets-Sheet 3

INVENTOR
O. H. Hansen
BY Morsell & Morsell
ATTORNEYS

INVENTOR
O. H. Hansen
BY Morsell & Morsell
ATTORNEYS

Patented July 18, 1933

1,918,641

UNITED STATES PATENT OFFICE

OSWALD H. HANSEN, OF CEDARBURG, WISCONSIN, ASSIGNOR TO HANSEN CANNING MACHINERY CORPORATION, OF CEDARBURG, WISCONSIN, A CORPORATION OF WISCONSIN

CAN FILLING MACHINE

Original application filed March 3, 1930, Serial No. 432,608. Divided and this application filed November 16, 1931. Serial No. 575,318.

This invention relates to improvements in the art of packing fluent commodities in containers, and relates more specifically to improvements in the construction and operation of machines for automatically measuring and delivering equal batches of liquid to successive receptacles of a series.

An object of the invention is to provide an improved measuring device for fluent materials, which is simple and compact in construction, and which is moreover highly efficient in operation.

Another object of the invention is to provide an improved liquid feeding mechanism especially applicable to can filling machines.

A further object of the invention is to provide improved material measuring structure which is automatic in operation and which may be conveniently adjusted to accurately vary the quantities of material measured, either while the machine is in operation or at rest.

Still another object of the invention is to provide a durable measuring and feeding mechanism, the various elements of which may be accurately machined at relatively low cost, and which may be operated at high speed with resultant great capacity. Another object of the invention is to provide a highly sanitary can filling machine all parts of which are readily accessible for inspection and cleaning, and which may be quickly assembled and dismantled.

A further object of the invention is to provide an improved can filler for delivering accurately measured homogeneous batches of mixture, each of which comprises equal proportions of several materials, to successive receptacles of a series.

Still another object of the invention is to provide improved liquid or other fluent material measuring means which is especially applicable to can filling devices, but which is capable of more general application.

These and other objects and advantages will be apparent from the following detailed description.

The present application is a division of application Serial No. 432,608, filed March 3, 1930, and any novel features of granular material measuring and feeding mechanism, disclosed but not specifically claimed herein, form the subject of said parent application.

A clear conception of embodiments of the novel features of the fluent material measuring mechanism constituting the present invention, and of the mode of constructing and operating machines in accordance therewith, may be had by referring to the drawings accompanying and forming a part of this specification in which like reference characters designate the same or similar parts in the various views.

Figure 1:
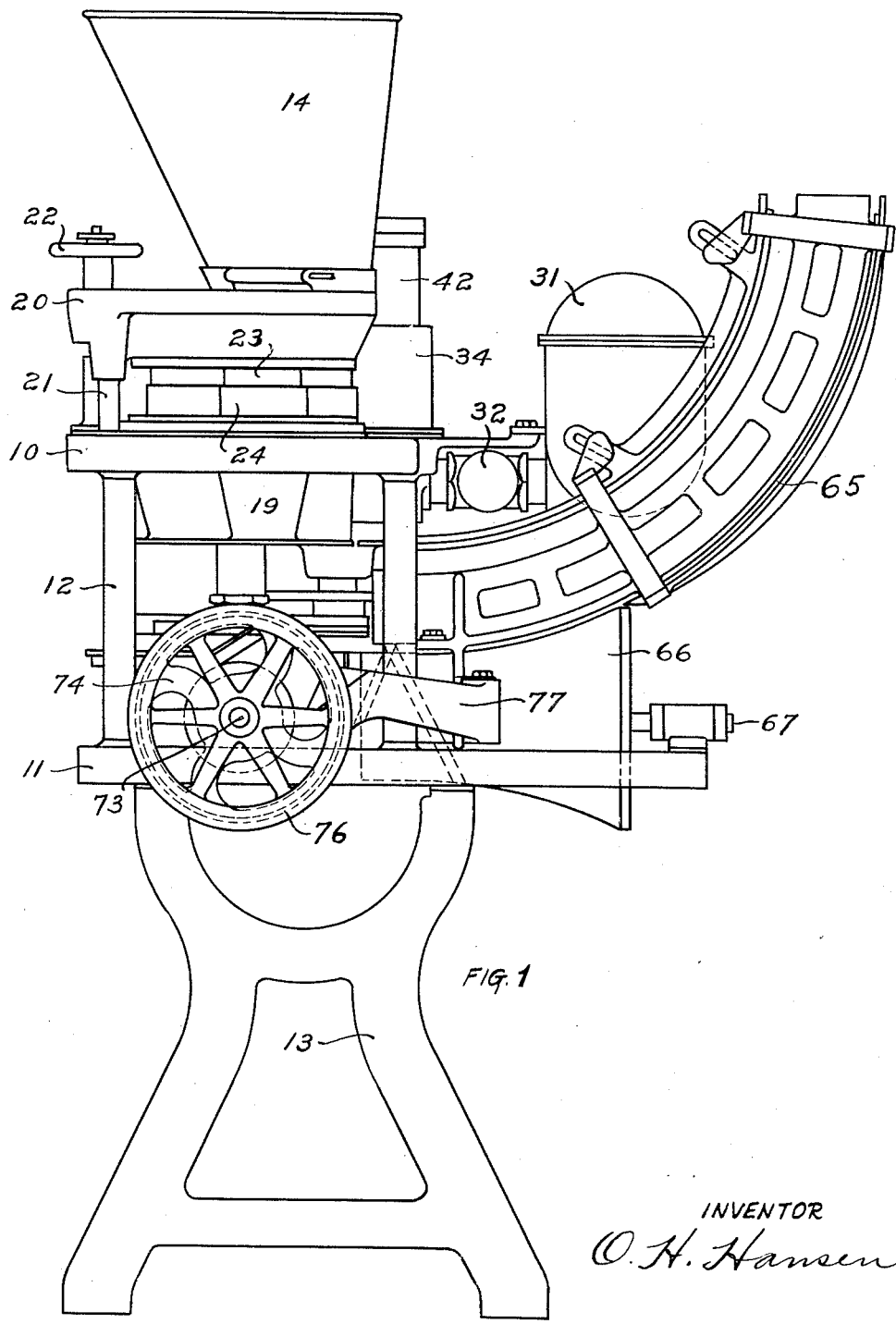
Fig. 1 is a side elevation of an improved can filling machine, looking toward the driving mechanism thereof.

The improved can filling machine specifically shown in the drawings, comprises in general a stationary frame assemblage consisting of an upper frame 10 and a lower frame 11 disposed in substantially parallel vertically spaced relation to each other; granular material measuring and feeding mechanism associated with one portion of the frame assemblage; liquid measuring and feeding mechanism associated with another portion of the frame assemblage; mechanism associated with the lower frame 11 for transporting the cans to, through and from the machine; and means for actuating the several mechanisms in properly timed relation to each other. The upper frame 10 is rigidly but detachably supported upon the lower frame 11, by means of a series of upright struts 12, and the lower frame 11 is supported at a suitable height above the floor level by means of supporting frame structure 13, as shown in detail in Figs. 1 and 2.

The granular material measuring and feeding mechanism which forms the subject of the parent application hereinabove referred to, comprises a stationary hopper 14 having therein an agitator 15, an annular series of five measuring pockets 16 successively communicable with the hopper discharge opening, a fixed plate 17 located beneath the pockets 16 and having a discharge opening 18 for permitting free gravity discharge of the contents of the successive pockets 16, and an annular series of five discharge chutes 19 located below the plate 17 and in vertical alinement with the pockets 16. The hopper 14 is supported upon a vertically movable non-rotary top plate 20 which is vertically adjustable along guide rods 21 by means of adjusting mechanism 22, so as to vary the volume of the measuring pockets 16 without interfering with the rotation thereof about the central vertical axis of the pocket series. The pockets 16 are formed in upper and lower members 23, 24 which are telescopically associated with each other so that the upper member 23 may be raised and lowered with the top plate 20, while the two members 23, 24 are at all times rotatable in unison.

Figure 4:
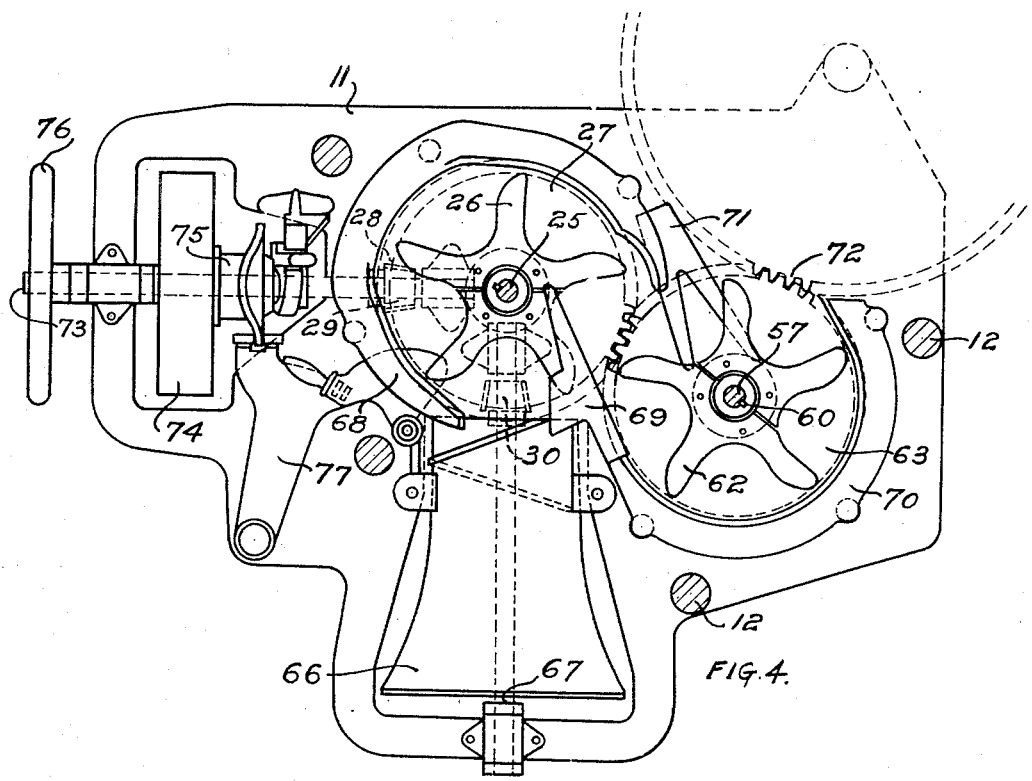
Fig. 4 is a top view of the driving and can conveying mechanisms.
Figure 3:
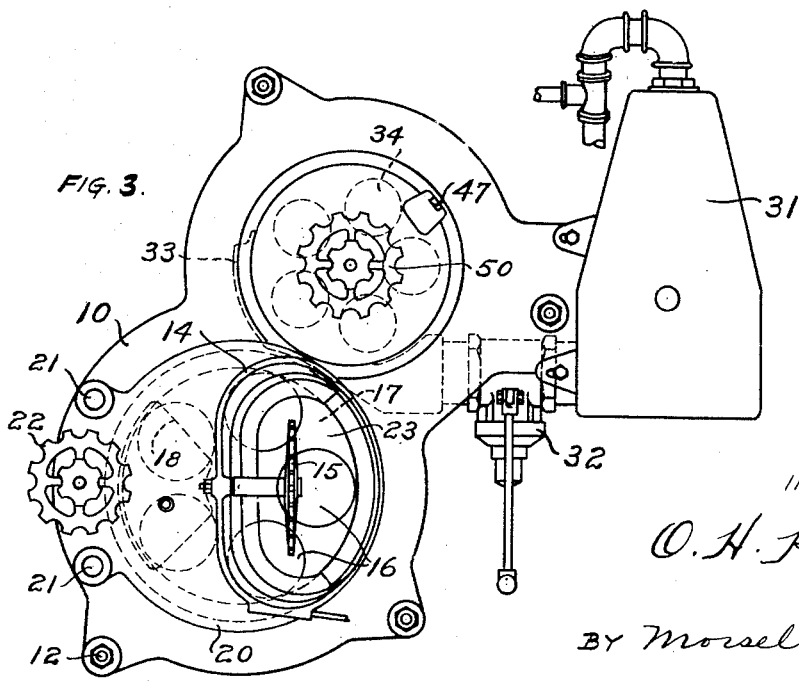
Fig. 3 is a top view of the supply and measuring mechanisms for the granular material and liquid.

The pocket forming members 23, 24 and the discharge funnels or chutes 19 are drivingly connected to an upright drive shaft 25 journaled in the horizontal frames 10, 11 and a series of can hooks 26 is also drivingly connected to the shaft 25 below the chutes 19. The can hooks 26 rest upon a rotary can support 27 having a toothed periphery as shown in Fig. 4, and the support 27 is also drivingly connected to the shaft 25 and rests upon a bevel gear 28 which is keyed to the shaft 25 and meshes with bevel pinions 29, 30. The can hooks 26 and discharge chutes are adapted to cooperate with cans of various height and diameter, and the weight of these elements and of the can support 27 is carried by the bevel gear 28 which in turn rests upon the lower frame 11.

Figure 5:
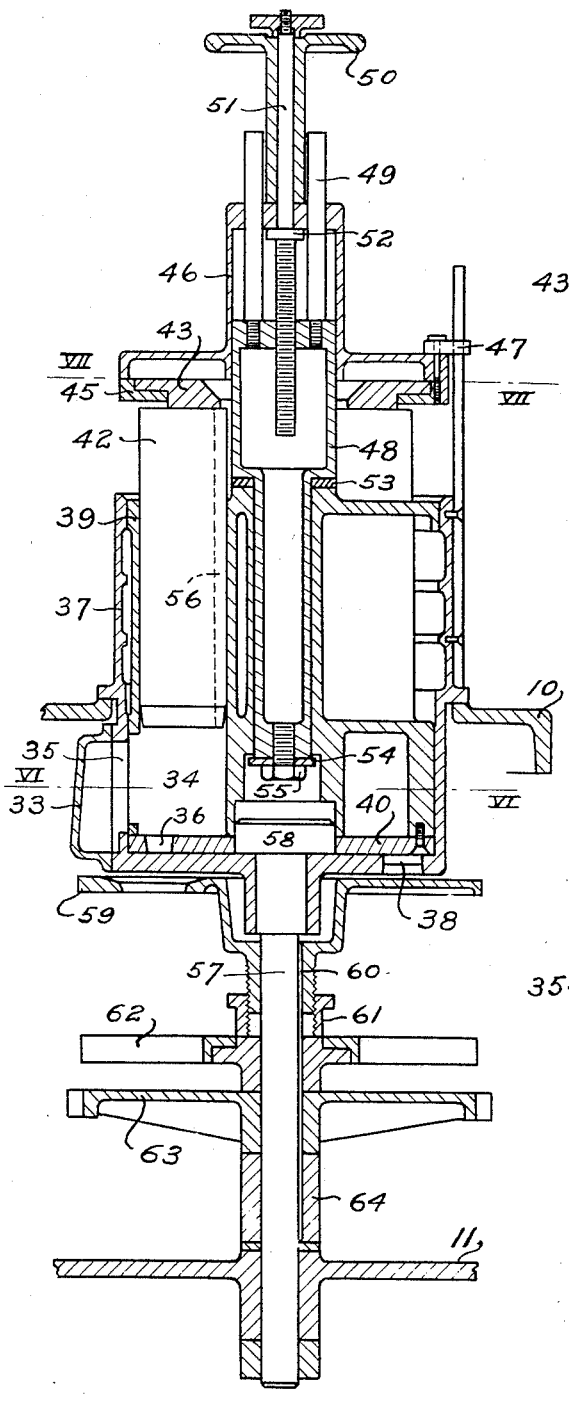
Fig. 5 is a fragmentary vertical section through the liquid measuring and feeding mechanism.
Figure 7:
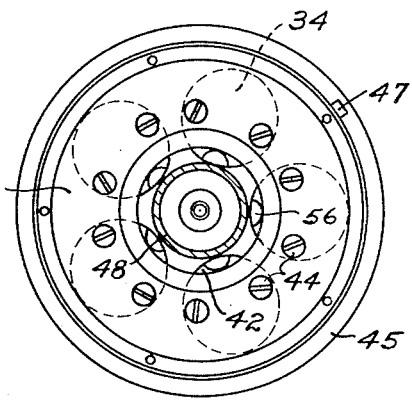
Fig. 7 is a horizontal section through the upper portion of the liquid measuring and feeding mechanism, taken on the line VII—VII of Fig. 5.

The liquid measuring and feeding mechanism is shown in detail in Figs. 3, 5, 6 and 7, and comprises a brine supply tank 31 which is adapted to deliver liquid past a control valve 32 to a manifold 33, an annular series of five brine measuring pockets 34 successively communicable with the manifold 33 through lateral lower inlet openings 35 and having bottom discharge openings 36, and a cup shaped casing 37 having an arcuate delivery opening 38 for permitting free discharge of the contents of the successive measuring pockets 34 to the successive cans. The brine measuring pockets 34 are formed in an element 39 having a bottom plate 40 in which the tapered openings 36 are formed, and these elements snugly fit and are rotatable within the stationary cup shaped casing 37 which is supported upon the upper frame 10. Vertically adjustable within each of the pockets 34, is a displacement plunger 42, and the upper extremities of all of these plungers are rigidly attached to a rotary adjusting plate 43 by means of screws 44, thereby making all of the plungers 42 simultaneously adjustable within the pockets 34. The top plate 43 is rotatably supported upon an annular bearing 45 which is detachably associated with an upper adjusting element 46, the latter being freely vertically movable but fixed against rotation by means of a guide 47. The element 46 is adjustable upon a stationary central member 48 having parallel guide rods 49 projecting upwardly therefrom through openings in the upper extremity of the element 46, by means of a hand wheel 50 secured to a rod 51 having screw threads cooperable with a threaded opening in the member 48 and carrying a lifting collar 52 coacting with a lower surface of the element 46. The medial portion of the central member 48 is shouldered and rests upon a thrust plate 53, while the lower end of the member 48 is provided with a retaining plate 54 held in place by a cap screw 55 and serving to facilitate removal of the pocket forming element 39 from within the casing 37. Each of the plungers 42 is moreover provided with an air vent 56 extending upwardly along the side thereof adjoining the central member 48, and the lower extremity of the plungers may be formed of reduced and slightly tapered cross-section as shown in Fig. 5, in order to permit unobstructed entry of brine to the pockets 34 when the plungers 42 are in contact with the plate 40, or nearly so.

Figure 6:
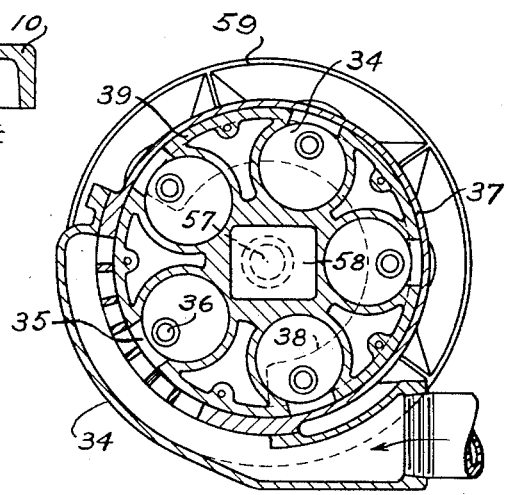
Fig. 6 is a horizontal section through the lower portion of the liquid measuring and feeding mechanism, taken on the line VI—VI of Fig. 5.

The pocket forming element 39, the bottom plate 40 and the plungers 42 are simultaneously revolvable about a vertical axis by means of a drive shaft 57 having a driving head 58 of polygonal shape at its upper end coacting with an eccentric polygonal recess in the element 39 and plate 4, as shown in Figs. 5 and 6. A splash prevention plate 59 is revolvable by the shaft 57 directly beneath the casing 37, and is vertically adjustable along the shaft 57 and the driving spline 60, by means of an adjusting sleeve 61 the upper end of which has screw thread coaction with the hub of the plate 59, and the lower end of which rests upon a set of can hooks 62. The can hooks 62 are likewise rotatable by the shaft 57 through the spline 60, and rest upon a rotary can support 63 having peripheral teeth meshing with the teeth of the can support 27 previously described. The can support 63 is supported upon the lower frame 11 through an intervening bushing 64 as shown in Fig. 5. The can hooks 62 are preferably so positioned that the successive cans will be conveyed with their upper open ends directly beneath and in vertical alinement with the successive openings in the splash plate 59, and this plate may obviously be adjusted to cooperate with cans of various heights.

Figure 2:
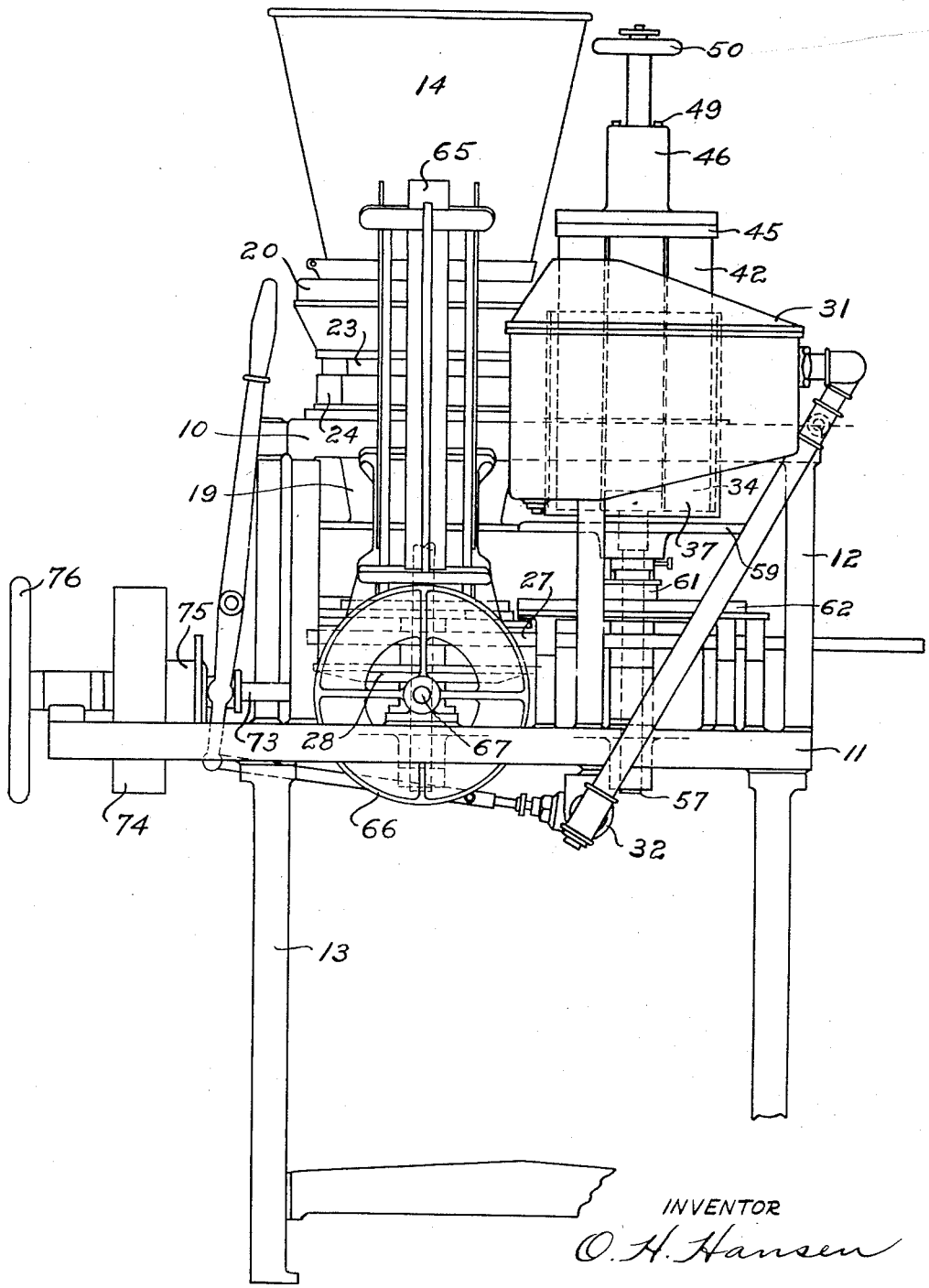
Fig. 2 is a front view of the improved can filling machine, looking toward the can supply.

The mechanism associated with the lower frame 11, for transporting the successive cans to, through and from the machine, is shown in detail in Figs. 1, 2 and 4. This mechanism comprises a stationary can chute 65 formed to deliver the successive empty cans upon a rotary tapered feed drum 66 mounted upon a horizontal shaft 67. The shaft 67 is continuously rotatable by the bevel pinion 30 secured to the shaft end and meshing with the bevel gear 28 which drives the shaft 25, and the drum 66 is adapted to feed the cans upon the rotating support 27 between the successive can hooks 26. The can hooks 26 and the support 27 cooperate with a fixed can guide 68 to convey the successive cans around the axis of the shaft 25 until they engage a fixed delivery guide 69 formed to feed the cans upon the second rotary support 63 between the successive can hooks 62. These can hooks 62 and the support 63 then cooperate with another fixed can guide 70 to convey the cans in succession around the axis of the shaft 57 until they engage a final discharge guide 71 which is adapted to deliver the finally filled cans upon a discharge disk 72 driven by the peripheral teeth of the can support 63. The drum 66, supports 27, 63, can hooks 26, 62, and disk 72, are operated at proper speeds so as to gradually convey the cans in succession and in properly timed relation to the material measuring and feeding mechanisms.

The driving mechanism for actuating the several measuring, feeding and conveying mechanisms in properly timed relation to each other, is shown in detail in Figs. 1, 2 and 4. This driving mechanism comprises in general a main horizontal drive shaft 73 adapted to be rotated by means of a pulley 74 through a clutch 75. The drive shaft 73 may also be manually rotated by a hand wheel 76, and the clutch 75 is operable by an automatic stop mechanism 77 in order to disconnect the power when the feed drum 66 fails to deliver an empty can to the machine during normal operation. The bevel pinion 29 which meshes with the bevel gear 28, is secured to the end of the main drive shaft 73, thus completing the driving connection between the shafts 73, 25.

During normal operation of the improved can filling machine, the driving mechanism just described is functioning to rotate the vertical shaft 25 through the bevel gearing 29, 28, and the can support 27 is imparting rotary motion to the second vertical shaft 57 through the can support 63. The rotary shafts 25, 57 impart rotary motion to the measuring pockets 16, 34 respectively, and the can feed drum 66 is being rotated to deliver the successive empty cans to the revolving support 27. The hopper 14 is supplied with granular material, and the brine supply tank 31 is delivering liquid to the manifold 33 past the control valve 32.

As the successive pockets 16 pass beneath the hopper 14, they are filled with granular material and are advanced toward the discharge opening 18 whereupon the measured batches of granular material are delivered by gravity through the funnels 19 to the successive cans positioned therebeneath. The partially filled cans are then transferred from the support 27 to the support 63 by means of the guide 69, preparatory to being supplied with measured batches of liquid. As the successive pockets 34 pass the supply openings of the manifold 33, they are filled with liquid entering through the lateral inlet openings 35. The liquid filled pockets 34 are advanced about the axis of the shaft 57 until the inlet openings 35 are cut off from the brine supply, whereupon the lower discharge orifices 36 of the pockets 34 are successively brought into communication with the arcuate discharge opening 38 of the casing 37, and the measured batches of liquid are then delivered by gravity into the successive partially filled cans through the openings in the splash plate 59. The cans are thus properly filled with batches of mixture, each comprising like proportions of granular material and liquid, and are subsequently delivered from the machine by means of the stationary guide 71 and the discharged disk 72.

If it is desired to vary the volumes of the batches of liquid being measured, it is only necessary to manipulate the hand wheel 50 either while the machine is in operation or at rest. Rotation of the wheel 50 simultaneously raises or lowers the fixed element 46, the thrust bearing 53, the revolving plate 43, and the plungers 42, relative to the stationary central element 48, thereby varying the volumes of the pockets 34. The volumes of the measured batches of mixture may thus be quickly and accurately varied, and the vents 56 insure complete filling of the measuring pockets with liquid.

The entire mechanism is moreover conveniently accessible for inspection and cleaning. The movable portion of the liquid measuring mechanism may be freely vertically removed from within the casing 37 by merely lifting the same upwardly with the aid of the hand wheel 50. When the hand wheel 50 is removed from the adjusting screw 51, the top element 46, the bearing plate 45, and revolving plate 43, and the plungers 42 may be simultaneously removed from the pockets 34 and the fixed element 37. The stationary central element 48, the pocket forming member 39, and the bottom plate 40 may be subsequently simultaneously removed from within the cup-shaped casing 37 and the driving head 58, whereupon the member 39 and the element 48 may be separated by releasing the cap screw 55. Removal of the shaft 57 simultaneously releases all of the elements driven thereby, thus permitting convenient dismantling of the entire machine.

The measuring pockets 34 are located closely adjacent to the axis of revolution thereof, as are also the recesses between the can hooks 62, thereby permitting operation of the machine at high speed. The delivery openings 36 are preferably located eccentrically relative to the cylindrical pockets 34, thereby permitting disposition of these measuring pockets close to the axis of revolution thereof, and the vents 56 insure rapid and complete filling of the successive pockets 34 with liquid. The adjustable splash plate 59 may be positioned closely adjacent to the tops of the open cans in order to prevent liquid from splashing therefrom, and is formed to drain drippings from the elements disposed thereabove, into the cans located therebelow. All elements of the structure may obviously be accurately machined at minimum cost, and the machine is entirely automatic and continuous in its operation and has enormous capacity.

It should be understood that it is not desired to limit the invention to the exact details of construction and operation herein shown and described, for various modifications within the scope of the claims may occur to persons skilled in the art.

It is claimed and desired to secure by Letters Patent:

1. In a filling machine, an annular series of measuring pockets movable about an axis, means for feeding liquid laterally into the successive pockets of said series remote from said axis, means providing a discharge opening for delivering liquid downwardly from the successive pockets of said series, and an adjustable plunger in each of said pockets, each of said plungers having a vent extending upwardly therealong adjacent to said axis and at the side of each pocket opposite said feeding means.

2. In a filling machine, an element forming an annular series of measuring pockets movable about an axis, a plunger in each of said pockets, a plate rigidly connecting all of said plungers, a bearing for said plate supported by said element, and means for moving said bearing to simultaneously adjust the position of all of said plungers within said pockets.

3. In a filling machine, a stationary casing having a side inlet and a bottom discharge, a pocket forming member snugly fitting and rotatable within said casing, a stationary central element resting upon said member, a series of plungers within said pockets, and adjustable means connecting said plungers and said element.

4. In a filling machine, a stationary cup shaped casing having a side inlet and a bottom discharge, a member snugly fitting and rotatable within said casing, said member forming a series of measuring pockets successively communicable with said inlet and discharge, a stationary central element secured to said member to effect removal thereof from said casing, a series of plungers within said pockets, said plungers being supported by said element, and means for effecting adjustment of said plungers relative to said pockets and said element.

5. In a filling machine, a member forming an annular series of measuring pockets, means for rotating said member about the axis of annularity of said series, a stationary central element resting upon said member, a plunger movable with and adjustable within each of said pockets, and a common bearing for supporting all of said plungers, said bearing being adjustably supported upon said element.

OSWALD H. HANSEN.